United States Patent
Easwar et al.

(10) Patent No.: US 6,529,633 B1
(45) Date of Patent: Mar. 4, 2003

(54) PARALLEL DIFFERENCE CODING METHOD FOR LOSSLESS COMPRESSION AND REAL TIME DECOMPRESSION

(75) Inventors: Venkat V. Easwar, Cupertino, CA (US); Ralph E. Payne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/394,114

(22) Filed: Sep. 10, 1999

Related U.S. Application Data

(60) Provisional application No. 60/100,505, filed on Sep. 16, 1998.

(51) Int. Cl.$^7$ .............................. G06K 9/36; G06K 9/46
(52) U.S. Cl. ..................... 382/239; 382/233; 358/462
(58) Field of Search .......................... 382/166, 232, 382/233, 239, 243, 244, 245, 246, 248, 250, 251, 253; 375/240.02, 240.08, 240.12, 240.24; 358/462, 464, 539

(56) References Cited

U.S. PATENT DOCUMENTS

| | | | | |
|---|---|---|---|---|
| 4,196,448 A | * | 4/1980 | Whitehouse et al. | 348/400 |
| 4,547,811 A | * | 10/1985 | Ochi et al. | 358/455 |
| 4,668,995 A | * | 5/1987 | Chen et al. | 382/272 |
| 5,345,317 A | * | 9/1994 | Katsuno et al. | 358/429 |
| 5,708,919 A | * | 1/1998 | Yamada et al. | 399/67 |
| 6,285,458 B1 | * | 9/2001 | Yada | 358/1.15 |
| 6,285,796 B1 | * | 9/2001 | Acharya et al. | 382/246 |

OTHER PUBLICATIONS

Delph, E.J., et al., *Image Compression Using Block Truncation Coding*, IEEE Transactions on Communications, COM–27 (9), pp. 1335–1342, (1979).

Lema, M.D., et al, *Absolute Moment Block Truncation Coding and Its Application to Color Images*, IEEE Transactions on Communications, COM–32 (10), pp. 1148–1157, (1984).

\* cited by examiner

*Primary Examiner*—Timothy M. Johnson
(74) *Attorney, Agent, or Firm*—Robert D. Marshall, Jr.; W. James Brady, III; Frederick J. Telecky, Jr.

(57) ABSTRACT

A block based hybrid compression method where the input page is classified as SOLID, TEXT, SATURATED TEXT or IMAGE type, and the compression method most appropriate for each class is chosen on a block by block basis. Blocks classified as IMAGE may be compressed using Parallel Differential Pulse Code Modulation. This method allows the decompression algorithm to decode multiple pixels in parallel, thus making real time decompression significantly easier to implement. The methods shown will execute very efficiently on a Texas Instruments TMS302C82 multiprocessing Digital Signal Processor.

36 Claims, 12 Drawing Sheets

FIG. 21

| 2001 | 2002 | 2003 | 2004 | 2005 | 2006 | 2007 | 2008 |
|---|---|---|---|---|---|---|---|
| 12 | 10 | 10 | 10 | 10 | 15 | 100 | 120 |
| 10 | 10 | 10 | 10 | 10 | 6 | 100 | 120 |
| 10 | 15 | 10 | 10 | 10 | 15 | 100 | 120 |
| 10 | 10 | 10 | 10 | 10 | 6 | 100 | 120 |

2009 spans columns 2001–2005; 2010 spans columns 2006–2008; 2011 spans 2006; 2012 spans 2007–2008.

FIG. 22

| 2101 | 2102 | 2103 | 2104 |
|---|---|---|---|
| 0 | 5 | 85 | 20 |
| 0 | −4 | 94 | 20 |
| 0 | 5 | 85 | 20 |
| 0 | −4 | 94 | 20 |

FIG. 23

| 2201 | 2202 | 2203 | 2204 |
|---|---|---|---|
| 1 | 4 | 8 | 6 |
| 1 | 3 | 8 | 6 |
| 1 | 4 | 8 | 6 |
| 1 | 3 | 8 | 6 |

```
┌─────────────────────┐
│   SUB BLOCK 0       │─2301
│   MAX Δ = 4 BITS    │
├─────────────────────┤
│   SUB BLOCK 1       │─2302
│   MAX Δ = 8 BITS    │
└─────────────────────┘
```

*FIG. 24*

```
         ┌──────────────────┬──────────────────┐
2401──   │  SUB BLOCK 0     │  SUB BLOCK 0     │──2403
         │  4 BITS/PIXEL    │  MODE = 10       │
         ├──────────────────┼──────────────────┤
2402──   │  SUB BLOCK 1     │  SUB BLOCK 1     │──2404
         │  8 BITS/PIXEL    │  MODE = 11       │
         └──────────────────┴──────────────────┘
```

| 2501 | 2502 | 2503 |
|---|---|---|
| MAXIMUM BIT SIZE OF DELTA IN SUB BLOCK | BITS USED FOR CODING | MODE BITS |
| 1 | 0 | 00 |
| 2 | 2 | 01 |
| 3 | 4 | 10 |
| 4 | 4 | 10 |
| 5 | 8 | 11 |
| 6 | 8 | 11 |
| 7 | 8 | 11 |
| 8 | 8 | 11 |

*FIG. 26*

PARALLEL DIFFERENCE CODING METHOD FOR LOSSLESS COMPRESSION AND REAL TIME DECOMPRESSION

This application claims priority under 35 USC §119(e)(1) of Provisional Application No. 60/100,505 filed Sep. 16, 1998.

TECHNICAL FIELD OF INVENTION

This invention relates in general to the field of image compression and decompression, and more particularly to a method of lossless compression and an efficient method of real time decompression of the compressed image.

BACKGROUND OF THE INVENTION

When printing a document, the page to be printed is typically composed electronically using software like QuarkXpress, Framemaker, etc. Internally the page is stored in a vector based graphical representation by these composition tools. This representation is then usually converted to another representation called a Page Description Language (PDL). Some composition tools generate the PDL directly. To print the page, the PDL representation is sent to the printer directly, or through a network. Before display or printing, a Raster Image Processor (RIP) must convert the PDL representation of the page to a raster (bitmap) representation at the desired resolution.

This conversion process can usually be divided into two stages: interpretation and rendering. Interpretation is the process where the original page description is reduced to a series of drawing primitives called the display list. Rendering is the process where these drawing primitives are converted to a bitmap in the frame buffer.

At high resolutions, a significant amount of memory is required to store this bitmap image. As an example, an 8.5"×11" (i.e. A4 size) page at a resolution of 600 Dots per Inch (dpi), 8 bits/pixel and 4 color planes will require 128 MB of frame buffer memory.

In order to reduce the memory requirement, the page may be divided into smaller portions or bands, with the band size being determined by the available frame buffer memory. Each band is then converted to bitmap form and passed on to the exposure module of the printer to make space for the subsequent bands.

Since in a typical non-impact printer the exposure module has to be fed with bitmap data at regular intervals, each band must be rendered in a predefined time. As rendering is computationally intensive and is influenced by the page content, such real-time rendering may not be possible for complex bands. In some cases real-time rendering may not be possible even though the bands are not complex. If the available memory is limited, there may not be sufficient room to store the original display list and other information required for rendering the page. If this is the case, each band must be pre-rendered, compressed and stored. After all the bands have been processed and compressed, they are decompressed in real time and fed to the exposure module.

There are various methods that may be employed to compress the rendered image. To maintain maximum image quality, a lossless or low loss method is preferred. Unfortunately, the amount of compression attainable with most of these methods is highly dependent on the page content—some pages will compress much more than others. Since the amount of memory and the page size are fixed, a method must be found that guarantees that all pages can be rendered and printed in real time. In addition, the requirement that the page be decompressed in real time also restricts the compression method selected to one of relatively low complexity. As an example, Direct Cosine Transform (DCT) based methods are very efficient in terms of compression ratio available, but are computationally too intensive to be used on the whole page.

SUMMARY OF THE INVENTION

The invention described herein presents a block-based hybrid compression method. The image to be compressed is first segmented into equal size, non-overlapping blocks of pixels. Each block is then classified as either SOLID, TEXT, SATURATED TEXT or IMAGE. This classification may be done by a number of methods. One of these methods is by determination of the Block Truncation Coding parameters of the block, and using these parameters for classification. Another, much simpler method is shown in this invention that does not require computing the BTC parameters.

After classification, the blocks may be compressed using a variety of algorithms such as Block Truncation Coding, Run Length Coding, Differential Pulse Code Modulation, or Discrete Cosine Transform. The method of compression is chosen depending on the classification of the block, as different classes lend themselves to more or less compression efficiency with the different algorithms.

Since the decompression of the image must take place in real time, the computationally simplest algorithm should be selected. A new compression/decompression algorithm is shown in this invention that significantly speeds up the decoding process of IMAGE blocks compressed using Differential Pulse Code Modulation by compressing the data in away that will allow the decompressor to decode a multiplicity of pixels at one time. Tuning parameters are available that will allow additional reduction of the decoding time at the expense of reduced compression ratios. This algorithm is particularly well suited to efficiently execute on a highly parallel Digital Signal Processor (DSP) such as the Texas Instruments TMS320C8X family of DSP's by fully utilizing the inherent parallelism of the processor.

BRIEF DESCRIPTION OF THE DRAWINGS

These and other aspects of this invention are illustrated in the drawings, in which:

FIG. 21 shows the prediction flow for Parallel Difference Coding;

FIGS. 22 and 23 show the difference block and the corresponding bits required to code the differences, derived from the example shown in FIG. 21; and FIGS. 24, 25 and 26 show the max_delta_bits, use_bits and mode bits derived using the look up table 2500 in FIG. 26.

DETAILED DESCRIPTION OF THE INVENTION

The present invention comprises a system to efficiently compress and decompress a stream of data that represents the content of a page to be printed. Most non-impact printers require the data to be printed to be available in real time. Once the printing of a page is started, it can not be interrupted. Since the data to be printed is stored in a compressed format to reduce the size of the physical memory required, the data must be decompressed in real time to keep up with the printer. For maximum throughput, compression should also be done in real time to avoid pauses between pages.

Figure 1:
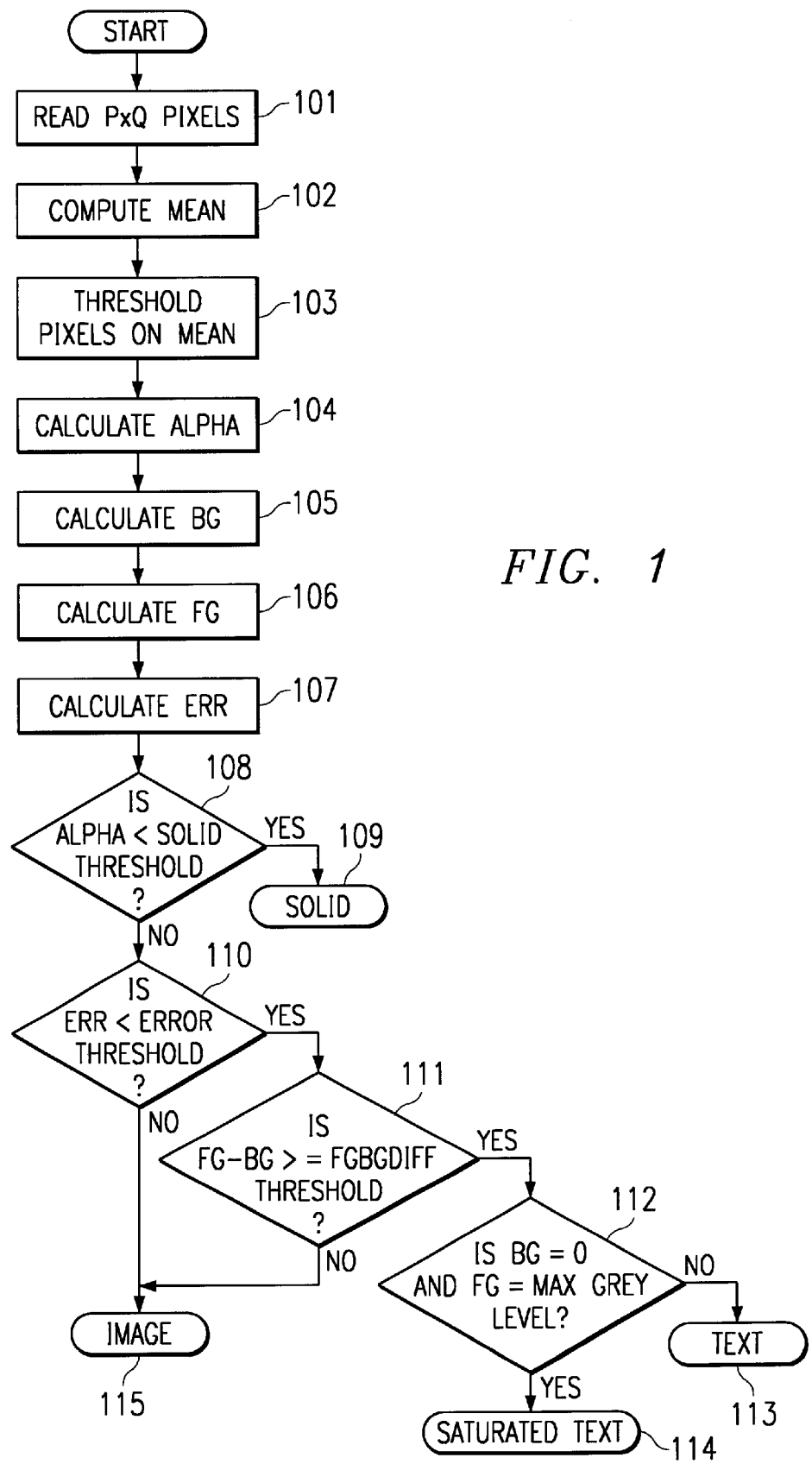
FIG. 1 is a flow chart of the block classification process during compression.

The compression method shown in the invention is block based. The page is segmented into equal size blocks of size pxq, and each block is then analyzed to determine the most efficient way to compress it. FIG. 1 shows the program flow to implement this classification of the blocks. First the block is prepared for BTC coding by thresholding the pixel data, based on its mean to create a binary bitmap. To aid in reconstruction, to reconstruction levels fg (foreground) and bg (background) are calculated to represent the block along with it's bitmap. The fg and bg values are chosen to preserve the mean m and the first absolute central moment alpha.

After starting the process, input function 101 reads pxq pixels that will represent the first block. The mean m is computed in 102 as follows: if g(i,j) represents the gray level of the pixel in the i row and j column of the block, and N=pq or the number of pixels in the block, then m is expressed as:

$$m = (1/N) * \sum_{i,j} g(i, j)$$

Function 103 then thresholds the block around mean m. A binary bitmap is formed where all pixels with gray levels g(i,j)>m are set to a 1 (foreground) and all those with g(i,j)<=m are set to a 0 (background). Function 104 then calculates the first absolute central moment alpha in the following manner:

$$alpha = (1/N) * \left( \sum_{i,j} |g(i, j) - m| \right)$$

Next, functions 105 and 106 will calculate the value of bg and fg as follows: let fgCount be the number of pixels in the bitmap set to the foreground (fg) and bgCount be the number of pixels set to the background (bg). If fgCount is 0, the block is classified as SOLID, and both fg and bg are set to the mean m. Otherwise, fg and bg are computed as follows:

$$bg = m - ((N*\text{alpha})/(2*bg\text{Count}))$$

$$fg = m + ((N*\text{alpha})/(2*fg\text{Count}))$$

The per pixel absolute reconstruction error, err, is calculated in 107 by is taking the average of the absolute differences between the original pixel gray level g(i,j) and the reconstructed level (fg or bg, depending on whether g(i,j)>m or g(i,j)<=m).

Figure 2:
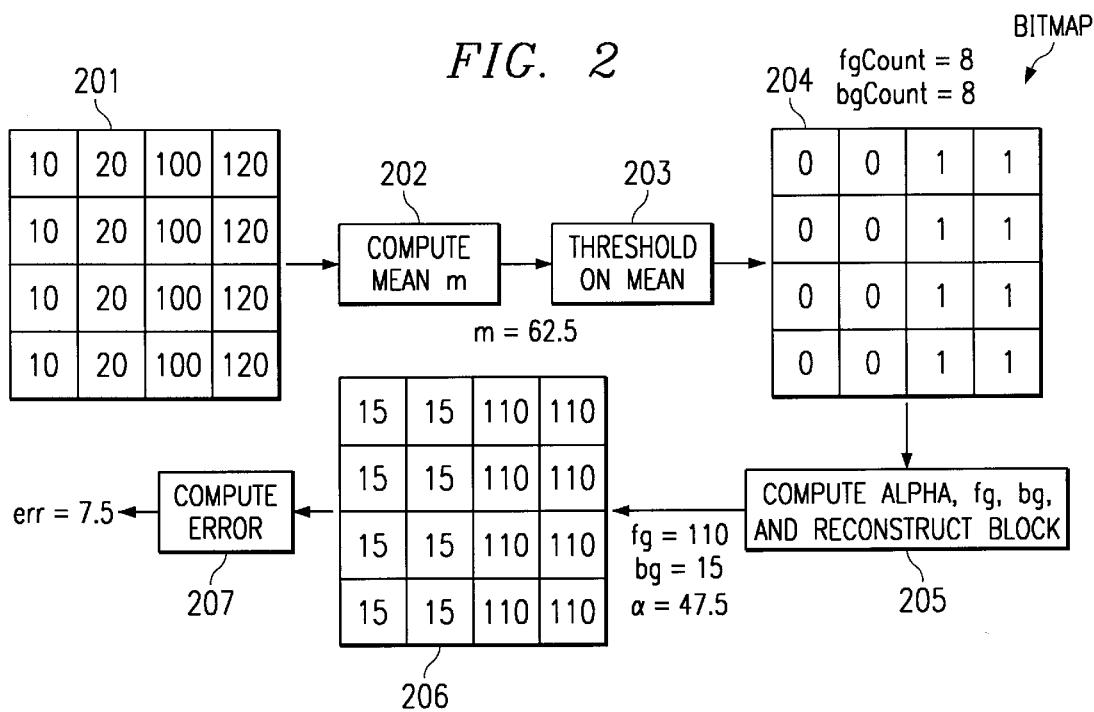
FIG. 2 is a block diagram showing an example of the classification flow.

FIG. 2 demonstrates an actual example of the above calculations, where 201 represent the original block. In this example, p=4, q=4 giving N=16. The mean m computed in 201 is 62.5, resulting in bitmap 204 after thresholding around the mean in 203. Bitmap 204 derives a fgCount of 8, and a bgCount of 8. Using the above formulas, fg is calculated in 205 to be 110, bg is 15 and alpha is equal to 47.5. Block 206 shows the reconstructed block, and the error (err) is computed in 207 to be 7.5.

Decision block 108 in FIG. 1 compares alpha to alpha (solidthreshold). If alpha<alpha(solidthreshold) the block is classified as SOLID in 109. Blocks with small first absolute central moments below alpha(solidthreshold) are classified as solid areas. If not, decision blocks 110, 111 and 112 complete the classification. If error (err) is found to be less than an error threshold in block 110 and if (fg−bg) is equal to or less than a foreground/background difference threshold (fgbgdiff) in 111, the block is classified as TEXT in 113 (typically the error threshold set to 0). Decision block 112 then further classifies the TEXT block. If bg equals 0 and fg equals the maximum gray level, the TEXT block is classified as SATURATED TEXT in 114. If the test in decision blocks 110 or 111 fails, the block is classified as IMAGE in 115.

An alternate, simplified block classification method may also be used, particularly in pages that will be predominantly coded using DPCM. Instead of computing the BTC parameters for the classification process, we may classify the blocks based on the following parameters:

1. The maximum and minimum values in the block are determined
2. If maximum=minimum, the block is classified as SOLID
3. If all pixels are equal to either the maximum or the minimum, the block is classified as TEXT
4. If the maximum is equal to the maximum gray level possible, and the minimum is equal to the minimum gray level possible, the block is classified as SATURATED TEXT
5. All other block are classified as IMAGE Since there are four primary classes, the class information may be coded in two bits. There are two ways to signal class information to the decoder:

1. Class information is transmitted per block. This imposes an overhead of two bits per block
2. Class information is only sent when the information changes and the class transitions may be signaled by the use of an <escape> codeword. Since this option is more efficient, we will assume that the preferred embodiment of the invention described here will be using that method.

In addition to the four primary classes, a fifth one is also possible. This is the RUN class used when a number of consecutive SOLID blocks are found. In this case run length coding is used for maximum efficiency. A run is signaled by the <escape> code followed by the code for the SOLID class. Since a RUN always follows a SOLID, we can implicitly assume that a SOLID class followed by the <escape> code followed by the SOLID code will signal a RUN.

An alternate method to code the class information would be to use Variable Length Codes. Measuring the frequency of occurrence of the different classes for a typical set of pages, assigning a shorter code for the more frequently occurring classes and transmitting this VLC code for the class information can do this. Another method that would allow transmission of more information in addition to the class would be the use of an <escape> code word. For example, if 00=SOLID block, 01=TEXT block, 02=IMAGE block, 03 then can be the <escape> code that is followed by a n-bit code that can signal additional state information such as:

Quantization step size (Qstep)

Change in image decimation factor

If the mode is to be toggled between SATURATED and UNSATURATED, etc . . .

Because coding of the current block depends on parameters of the previous block (mean, class, etc.) these parameters are preserved from one block to the next. An example of this dependency is when the mean of one block is used to predict the mean of the next block. Default values are used for the first block in each row of blocks. This state information includes:

Last mean m

Previous block's foreground (fg)

Previous block's background (bg)

Previous class

Current run length count

Current compression ratio

Flag to signal if last class was changed

Once the block is classified, the appropriate compression algorithm is selected based on the block's class and the required compression ratio. The following table shows the selection criteria:

Differential Pulse Code Modulation (DPCM) is used to compress SOLID blocks

Consecutive SOLID blocks (Runs) are compressed using Run Length Coding

Block Truncation Coding (BTC) is used for TEXT and SATURATED TEXT.

Decimation is performed on IMAGE blocks, followed by BTC. Alternatively, DPCM or Discrete Cosine Transform (DCT) based compression methods may be used.

DPCM coding may be lossless or lossy, depending on the compression ratio requirement. In lossless DPCM, an augmented form of the JPEG lossless difference coding method is used. The JPEG compression algorithm is well known in the art. The augmentation of this invention consists of the following:

An <escape> codeword is used to signal block class transitions

Prediction will depend on the class of the previous block. For example, if the previous block is TEXT, then the background bg may be used to predict the mean m. If the previous block is IMAGE or SOLID, and then the previous mean is used as the predictor.

Figures 8, 9, 10:
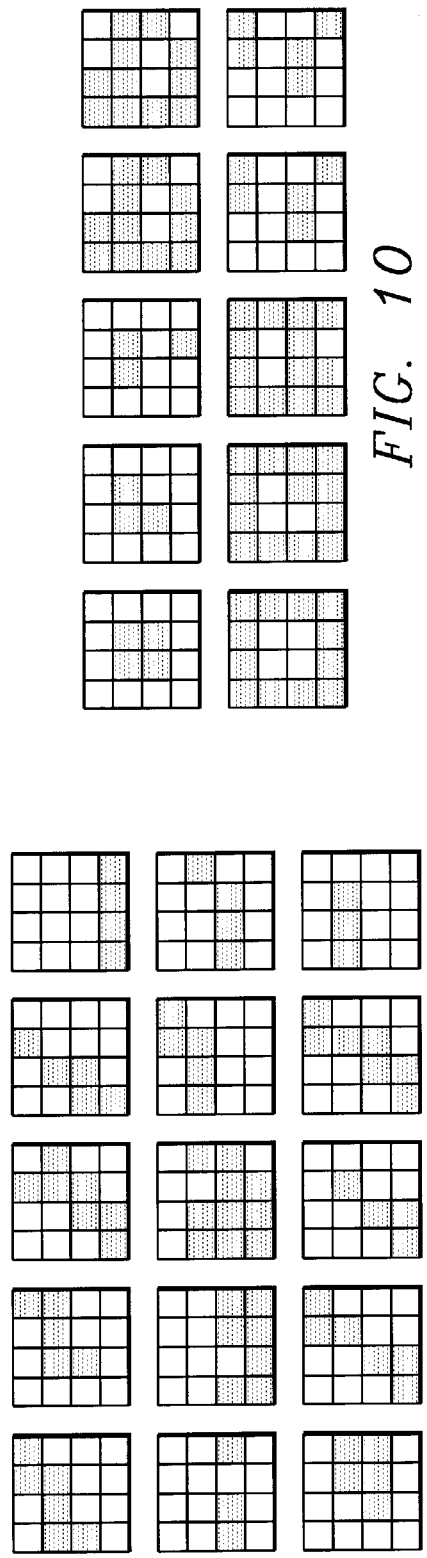
FIG. 8 demonstrates the lossless DPCM coding.
FIGS. 9 and 10 show examples of valid and invalid pixel patterns in blocks classified as text or SATURATED text.

The JPEG lossless difference-coding algorithm performs entropy coding of the difference between the actual mean and the predicted mean. The simplest prediction mode where the previous mean is used to predict the current mean is employed. The difference value is segmented into one of nine categories we will call SSSS, depending on the number of bits required to represent the number. This is illustrated in FIG. 8. For non-zero differences, immediately following the codeword for the category, SSSS additional bits are transmitted. As can be seen in FIG. 8, if |Delta m|>=, the coded bit representation is larger than the original representation. This means that while for most pages there is compression of the data, it is possible that for some pages there will actually be a data expansion. The following options may be used to eliminate such cases:

Use lossy DPCM

Turn off difference coding by signaling appropriately at the beginning of each row of blocks In lossy DPCM the difference signal is quantized before transmission. The quantizer is a function that maps many input levels to fewer output levels. Different types of quantizers may be used:

Uniform quantizers may be used by defining a quantization step size Qstep. This quantization may be performed analytically by division and truncation:

$$Out = truncate\left(\frac{In}{Qstep}\right)$$

Non-uniform quantizers may be defined using look up tables (LUT).

Compandors may be used. In a compandor, the input is first compressed dynamically through a LUT, followed by a uniform quantization. At the output, it is dequantized and then expanded using the same LUT function.

Since in this method of compression the decoder only has access to the reconstructed mean, foreground and background, the compression side algorithm also uses the reconstructed values for prediction and not the original values.

When coding UNSATURATED TEXT using BTC, the parameters fg, bg, and the corresponding bitmap are transmitted. The fg and bg are difference (DPCM) coded, with the previous blocks fg and bg used as predictors.

Text areas have relatively poor compression ratio. For example in the case of a 8×8 block, SOLID blocks have a compression ratio 64:1, IMAGE blocks are greater than 16:1 when compressed using a 4:1 decimation followed by DPCM, whereas text areas have compression ratio only slightly over 6.4:1. This causes a problem with composite pages containing closely packed text with small point sizes. It is possible to improve text compression by pre-storing bit patterns that occur frequently. For example, 256 frequently occurring patterns can be stored using only 8 bits as an address. The closest pattern is then determined, and the pattern index is transmitted rather than the original bitmap. This will lead to a greatly improved compression ratio. The closest matching pattern may be determined using a content addressable memory search technique.

Since TEXT blocks have the lowest potential compression ratio, it is important to minimize miss-classification of blocks as TEXT. The following techniques may be used to minimize such miss-classification:

By generating a large number of text pages with various fonts and point sizes and then examining 4×4 pixel block patterns, we can class the patterns as valid or invalid. FIGS. 9 and 10 show examples of valid and invalid patterns respectively. A block containing an invalid pattern can therefore be re-classified as an IMAGE block.

Typically, contiguous TEXT blocks will have the same foreground and background. As an example, if the current block is classified as a TEXT block, and the previous block is also a TEXT block but does not have the same foreground and background, the current block may be re-classified as an IMAGE block. Similarly, if the previous block is classified as SOLID but has a mean that does not match the current foreground or background, the current block may be re-classified as an IMAGE block.

IMAGE blocks usually contain a large amount of redundant information. A rule of thumb in the graphics world is that the source image is scanned or digitized at twice the resolution of the halftone screen frequency. Assuming a 150 lines per inch (LPI) screen, source images are typically digitized at 300 dots per inch (DPI). For printing, this is expanded to the device resolution (usually 600 dpi or greater) by pixel replication or by interpolation, creating a large amount of redundant information. As the first step of the compression of IMAGE blocks, this redundancy is eliminated by decimating the image. The decimation ratio depends on the required compression ratio and the required print quality. A ratio of 2:1, 3:1 or 4:1 may normally be used. After decimation, the pixels are typically averaged for better image quality. Depending on the quality required, more complicated filters may also be used, but the quality, in most cases, is not improved significantly over simple averaging. After decimation, the blocks may be coded in one of three ways:

Block Truncation Coding (BTC). This is the simplest of the three methods, particularly since it is part of the process by which blocks are initially classified. During the classification process, the BTC parameters alpha, mean, error, foreground and background are calculated, and are available to be used during compression. The method is explained earlier, and is shown in FIGS. 1 and 2

Difference coding (DPCM). Each pixel is predicted from the pixel occupying the same position in the previous block Discrete Cosine Transform Coding (DCT). The block is transformed into the frequency domain, and then quantized. This method is used in the JPEG image compression standard, and is well known in the art. It is very efficient in terms of compression, but is also very computationally intensive.

Figure 3:
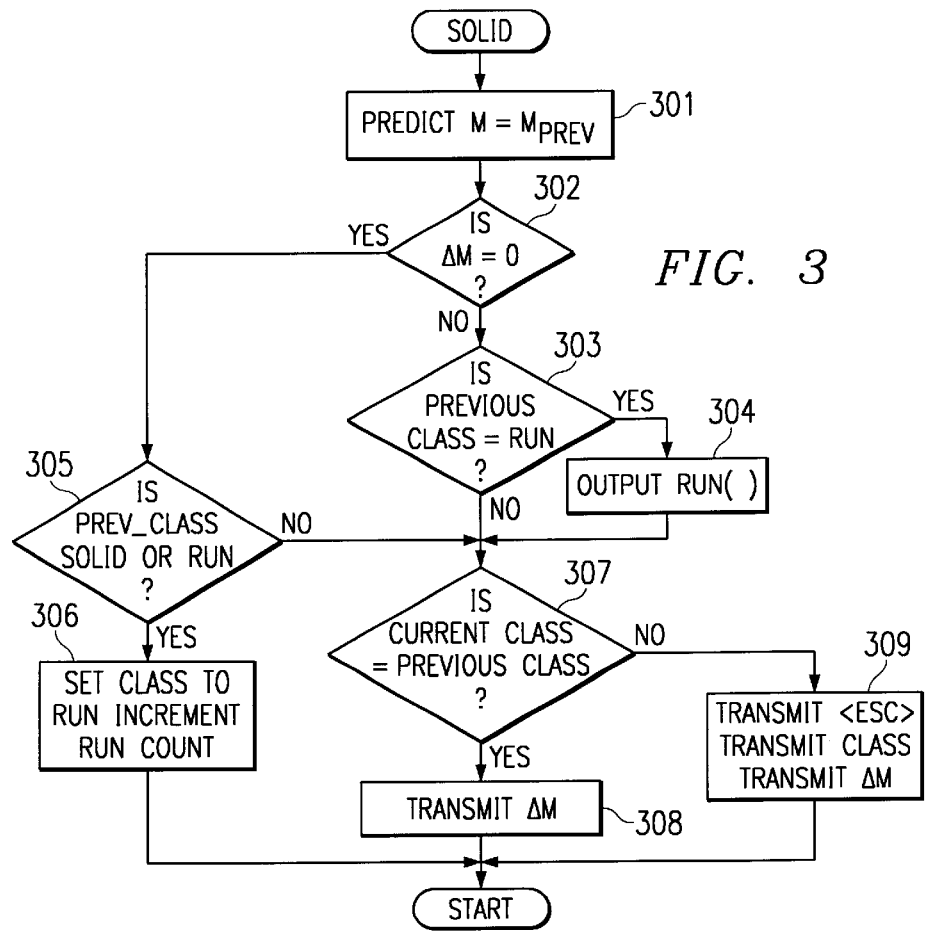
FIG. 3 is a flow chart showing the compression of blocks classified as solid.

Multiple contiguous SOLID blocks with the same mean m are encoded using run length coding. As seen in FIG. 3 when Delta m is equal to zero and the previous class is a SOLID the class is reset to RUN, and a run counter is updated. No data is output until the class changes from RUN to an other class. At the change, the procedure output_run( ) is called.

The procedure output_run( ) has 2 predefined parameters—MIN_RUN and MAX_RUN_BITS. MAX_RUN is then defined to be MAX_RUN=$2^{MAX\_RUN\_BITS}$. Only those runs that exceed MIN_RUN in length are run length coded. Those that are smaller are output as a series of SOLID blocks. This is because there is an overhead involved in signaling a RUN, and it is expensive in terms of bits used to code small runs. The length of the run is then transmitted using MAX_RUN_BITS. If the run length exceeds MAX_RUN-1, a 0 is used to signal this, followed by the difference (RUN-(MAX_RUN-1)). This procedure is then continued until the entire run length is transmitted.

To reduce system overhead, it may be desirable to define a macroblock (a rectangular collection of blocks). For example, we may have an 8×8 macroblock composed of four 4×4 blocks. The motivation for such a data structure would be the following:

Class information is sent at the macroblock level reducing overhead. In this case, BTC analysis is still done at the block level. If any block in the macroblock is an IMAGE, the entire block would be classified as an IMAGE The prestored pattern technique described earlier for text areas may be used at the macroblock level to reduce the size of the associative memory needed.

Since the effective compression ratios achieved are highly dependent on the image content, a mechanism for compression ratio control is an absolute requirement to prevent overflowing the physical frame memory. In the embodiment of this invention, the compression ratio is dynamically controlled by adjustable control parameters such as:

Quantization Step. Increasing Qstep has the effect of improving DPCM compression performance Image decimation factor Block size. Larger block size leads to higher compression ratios, and also reduces the overhead required to signal class change information Block classification. A SOLID block will compress more than an IMAGE, which will compress more than a TEXT block. More SOLID blocks can be forced during block classification by increasing ALPHAthreshold, and TEXT blocks decreased by increasing fgbgdiff threshold.

These control parameters may be adjusted after each row of blocks, every N blocks, or signaled with an escape code as shown earlier. The extent of adjustment is determined by doing a compression ratio sensitivity analysis of the various parameters for a typical suite of pages. As a final, fall back option if the above described feedback system does not achieve the target compression ratio, the entire frame buffer may be decimated to achieve the desired ratio. Alternatively, the entire buffer may be coded as IMAGE class. It must, however be remembered that increasing the compression ratio will usually result in a reduced image quality.

Some composite pages may be completely filled with images, and some only partially filled. It is advantageous to maintain "first" and "last" image block in a row parameter to estimate the area of the IMAGE blocks. This information can then be used in choosing the control parameters. Alternately, the display list may be used to compute the relative areas of SOLID, IMAGE and TEXT blocks. This information can then be used to determine the initial compression control parameters.

In case of color images, the methods described in this invention can be applied independently to each color plane depending on the color space used—RGB, CMYK or YCrCb.

FIG. 3 shows the compression flow for a block classified as SOLID. Function 301 sets m equal to the previous m as a prediction, then in decision block 302 we check if delta m (predicted m-calculated m) is 0. If not, we go to decision block 303 to determine if the previous class was RUN. If yes, a non-zero m indicates that the current block is not part of the RUN, and function 304 calls the output_run( ) function which will transmit the terminated run class, and return control to decision block 307. If decision block 303 finds that the previous class was not a RUN, it will also transfer control to block 307. Decision block 307 checks if the current class is equal to the previous class. If yes, the value of Delta m is transmitted in 308, and control is returned to START. If the classes differ, 309 transmits the <escape> code indicating a change in the class followed by the 2-bit class code and the calculated Delta m, then returns to START. If block 302 finds that Delta m is equal to 0, decision block 305 will check if the previous class was SOLID or RUN. If not, control is transferred to block 307. If yes, this indicates the start or the continuation of a RUN. Function 306 will set the current class to RUN (if not already set), increment the run block count, and returns to START.

Figure 4:
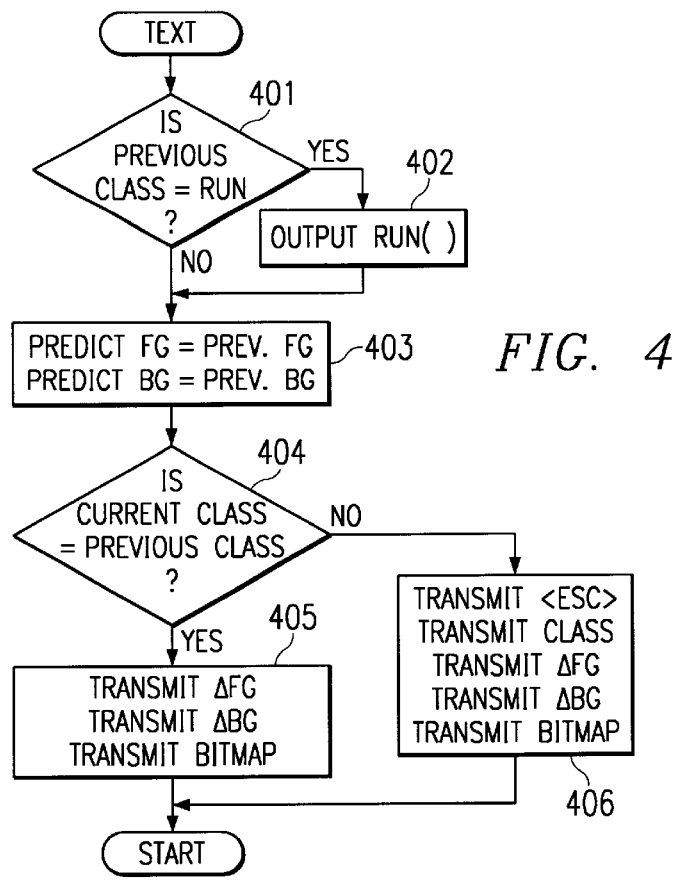
FIG. 4 is a flow chart showing the compression of TEXT blocks.

FIG. 4 shows the processing steps involved in compressing a block classified as TEXT. Decision block 401 tests if the previous class was RUN. If it was, the output_run( ) function is called in 402 to process the terminated RUN class. The output_run( ) function will return control to function block 403. If we find in block 401 that the previous class was not RUN, function block 403 will set the predicted fg equal to the previous fg, and the predicted bg equal to the previous bg. Block 404 then tests if the current class is equal to the previous class. If yes, block 405 transmits the calculated Delta fg, the calculated Delta bg, the new bitmap, and then returns to START. If the current class is different from the previous class, 406 will transmit the <escape> code indicating a class change followed by the 2-bit code representing the new class. Next, the calculated Delta fg and Delta bg is transmitted, followed by the new bitmap. Control is then transferred back to START.

Figure 5:
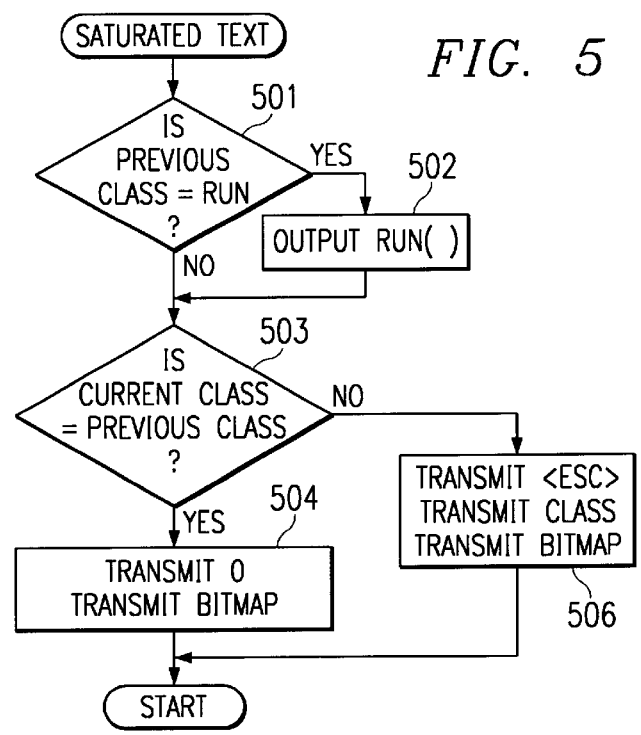
FIG. 5 is a flow chart showing the compression flow for SATURATED TEXT blocks.

If the block was classified as SATURATED TEXT, the flow shown in FIG. 5 is used. Decision block 501 tests if the previous class was RUN. If it was, the output_run( ) function is called in 502 to process the terminated RUN class. The output_run( ) function will return control to function block 503. If we find in block 501 that the previous class was not RUN, block 503 will test if the current class is equal to the previous class. If it was, block 504 will transmit a 0 followed by the new bitmap. The 0 is transmitted as a filler, since the decompression algorithm will expect a VLC code in this position even though in the case of SATURATED TEXT there is no code. If we find in 503 that the current class differs from the previous class, block 505 will transmit the <escape> code signaling the class change, followed by the 2-bit class code and the new bitmap representing the block. In either case, control will return to START.

Figure 6:
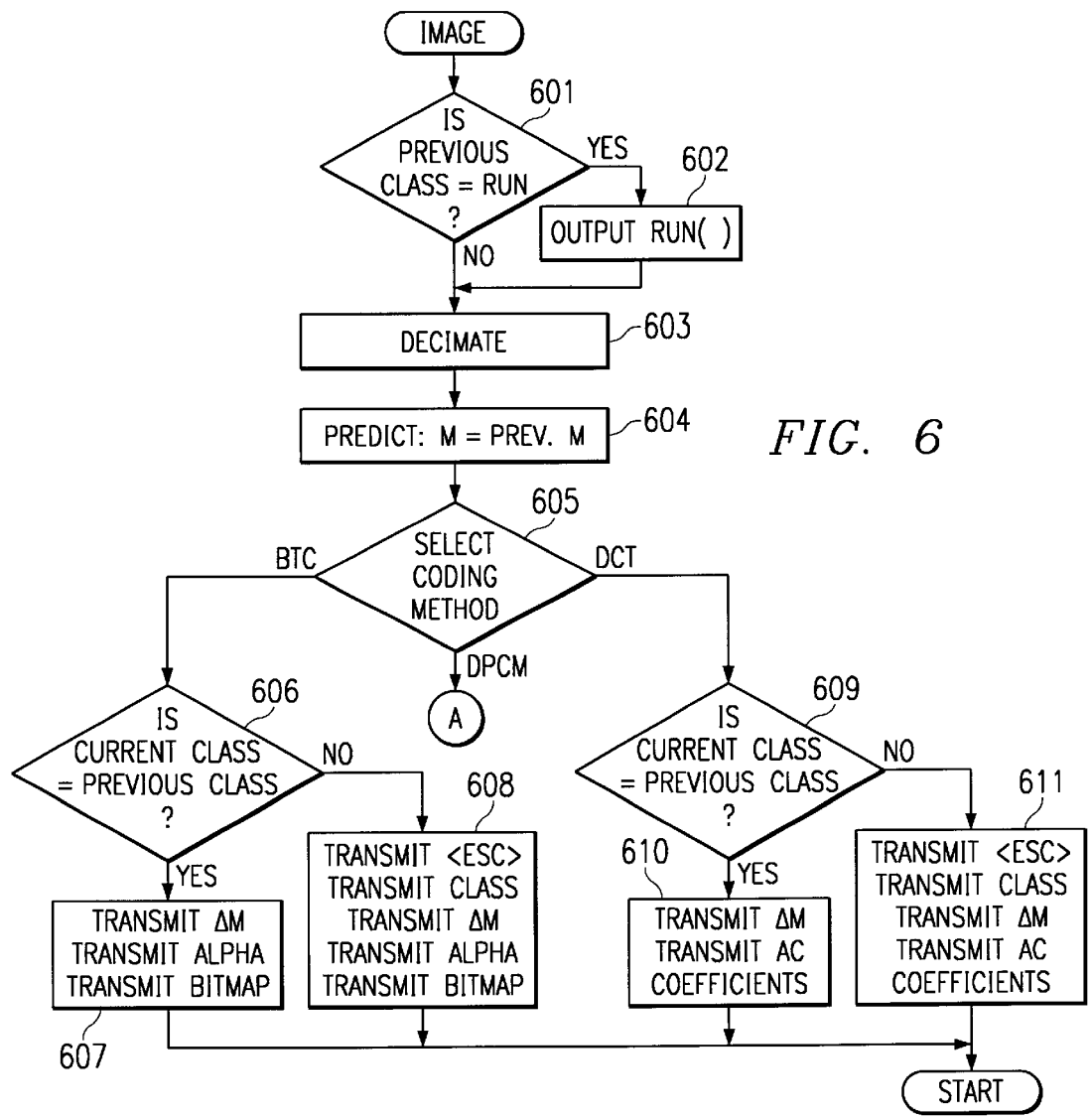
FIG. 6 is a flow chart showing the compression of Image blocks.
Figure 7:
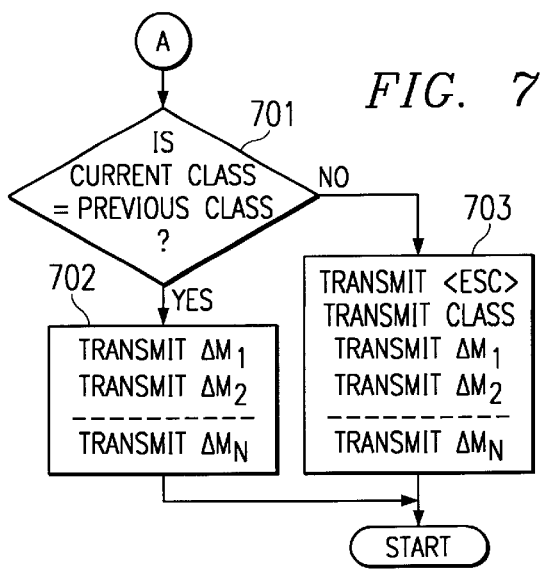
FIG. 7 is a continuation of FIG. 5.

FIGS. 6 and 7 show the compression flow for IMAGE blocks. Starting at FIG. 6, decision block 601 tests if the previous class was RUN. If it was, the output_run( ) function is called in 602 to process the terminated RUN class. The output_run( ) function will return control to function block 603. If the previous class was not RUN, the program flow goes directly to function block 603, where the image data is decimated. After decimation, the predicted m is set to the previous m in block 604. Decision block 605 then selects one of three compression methods: Block Truncation Coding (BTC); Differential Pulse Code Modulation (DPCM); or Discrete Cosine Transform (DCT). The compression method selected depends on the required compression ratio, available computing resources and printer speed.

If BTC is selected, block 606 will test if the current class is equal to the previous class. If yes, block 607 will transmit the calculated Delta m, followed by Alpha and the new bitmap. Control then returns to START. If the test in 606 fails indicating a change in class, block 608 will transmit the <escape> code, the 2-bit code for the new class, followed by Delta m, Alpha and the new bitmap, followed by a return to START.

If Discrete Cosine Transform (DCT) was selected, decision block 609 will test if the current class is equal to the previous class. If yes, block 610 will transmit the Delta m, followed by the quantized AC coefficients, then returns to START. If the current class is different from the previous class, block 611 will transmit an <escape> code followed by the new class information, the Delta m, and the quantized AC coefficients. When completed, control returns to START.

FIG. 7 shows the program flow when DPCM was selected. First, block 701 will test if the current class is equal to the previous class. If yes, block 702 will transmit the difference coded delta between the mean and each pixel. If the current class is not the same as the previous class, block 703 transmits the <escape> code signifying the class change, followed by the 2-bit class code, and the encoded delta values. In either case, the flow returns to START.

Figure 11:
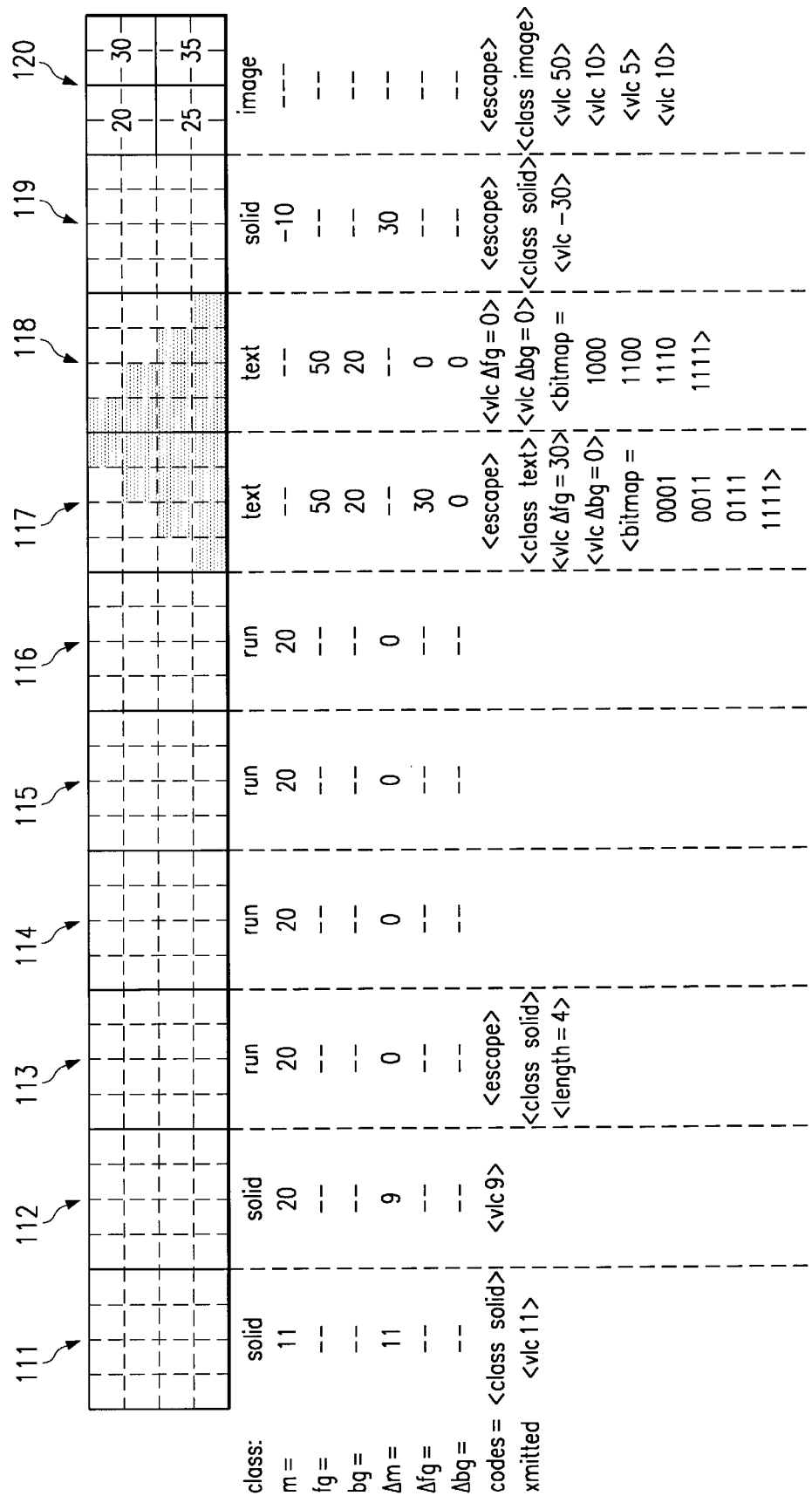
FIG. 11 shows an example of coding a row of Image blocks.

FIG. 11 shows an example of the compression flow for a number of differently classified blocks. The block size was selected to be 4×4, and the IMAGE block was decimated 2:1 and then coded using DPCM. Block 111 is a SOLID block, with m=11. Block 112 is also SOLID, with an m of 20, giving a Delta m of 9. Block 113 is SOLID with m=20. Since Delta m=0 and the previous class is SOLID, this block is reclassified as RUN. As blocks 114, 115 and 116 are also SOLID with m=20, the run length is 4. Block 117 is TEXT, thus terminating the run. For block 117, fg=50 and bg=20. Since the previous m (20) was used as a predictor for m, Delta fg is 30, with Delta bg being 0. In block 118 fg and bg are the same as in 117, with 0 Deltas. Block 119 is a SOLID block with m=10 giving a Delta m of 30. The previous block's bg value is used as the predictor for m. Block 120 is IMAGE. It is shown decimated 2:1, resulting in a 2×2 block. Starting with the previous m=10 and the upper left block, the difference code is (20−10)=10. Going counterclockwise, the next code is (25−20)=5, then (35−25)=10. The last code is (30−35), which is then set to the saturated foreground value of 50.

Figure 12:
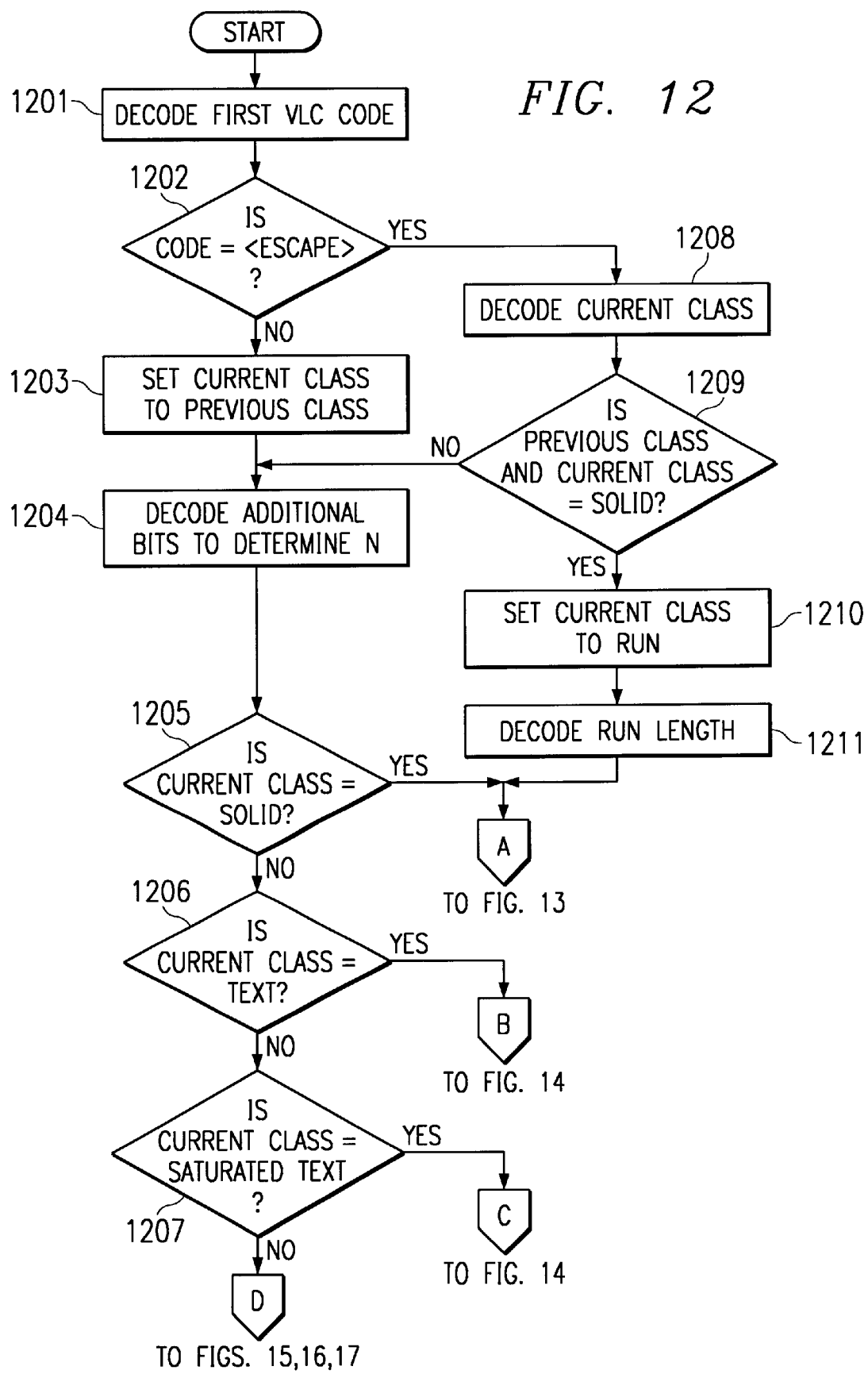
FIG. 12 is a flow chart showing block classification during decompression.

FIG. 12 shows the logic flow during decompression. The first step is to determine the block's class, so that the appropriate decompression algorithm may be selected. Function block 1201 starts the process by decoding the first VLC code. Decision block 1202 then determines if it represents an <escape> code. If no, we set the current class equal to the previous class, and decode the additional input bits required to determine N in block 1204. Decision blocks 1205, 1206 and 1207 then implement a branch to the appropriate place depending on the current class.

If block 1202 detected an <escape> code, we branch to block 1208 to decode the next 2 bits, giving the new current class code. Decision block 1209 than checks if the previous class and the current class are both SOLID. If yes, the current class is set to RUN in block 1210, and the run length is decoded in 1211. Control then passes to the decompression algorithm used for SOLID blocks. If the test in decision block 1209 fails, control is passed to block 1204.

Figure 13:
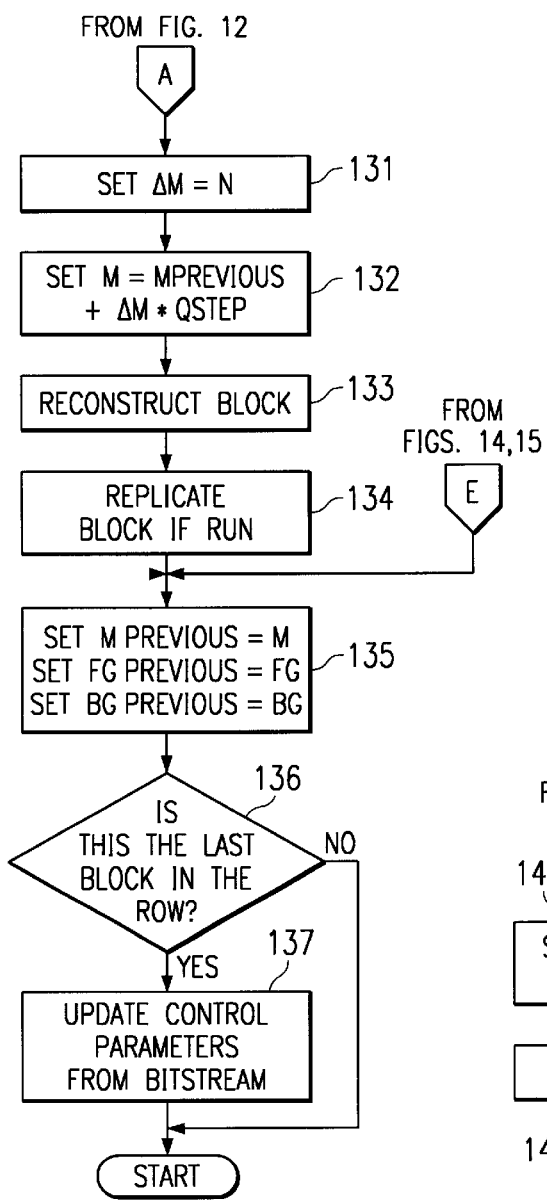
FIG. 13 is a flow chart showing the decompression of blocks classified as SOLID.

FIG. 13 demonstrates the steps used in decoding SOLID and RUN blocks. In function 131, Delta m is set so the value of N decoded in block 1204. Block 132 then calculates and de-quantizes the new mean, m=previous_m+(Delta_m*Qstep). Function 133 will reconstruct the block by replicating the mean p×q times. If the class was RUN, block 134 will replicate the reconstructed block based on the run length value decoded in function 1211.

Function blocks 135, 136 and 137 are common to all classes. Block 135 sets m-previous to the current m, fg_previous to the current fg, and bg_previous to the current bg, thus providing the prediction values to the next block. Decision block 136 then check if this is the last block in the current row. If not, control will return to START. If this is the last block, function block 137 updates the appropriate control parameters from the bitstream, then returns to START.

Figure 14:
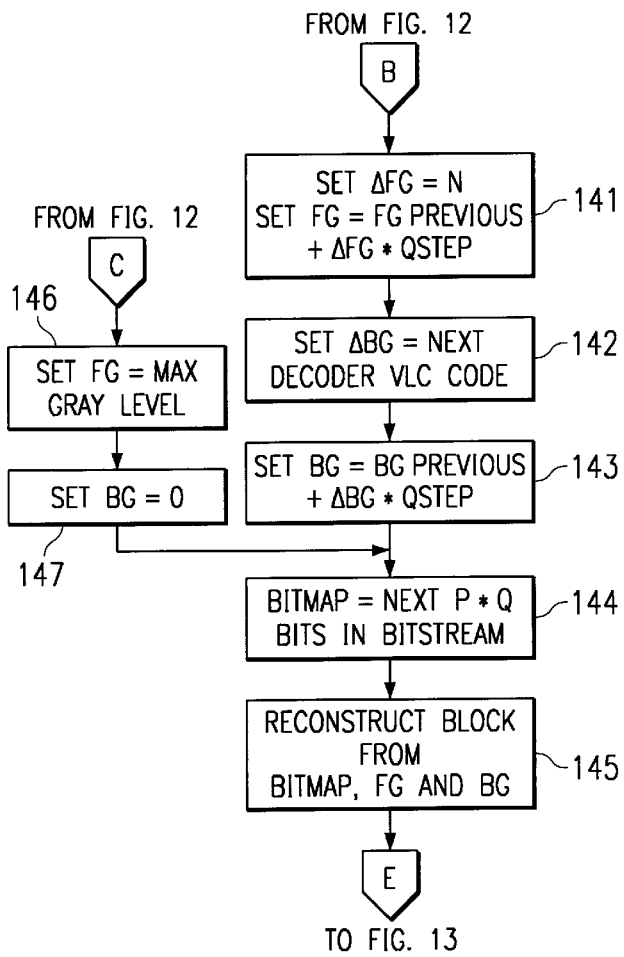
FIG. 14 is a flow chart of the TEXT and SATURATED TEXT decompression.

FIG. 14 shows the decompression flow for blocks classified as TEXT and SATURATED TEXT. For TEXT, function 141 sets Delta_fg to N decoded previously in 1204, and then calculates fg as follows: fg=fg_previous+(Delta_fg*Qstep). In block 142 we decode the next VLC code. This represents the value of Delta_bg. Block 143 then computes bg as follows: bg=bg_previous+(Delta_bg*Qstep). The next pxq bits are then read from the bitstream in function 144. These bits represent the bitmap for the block being decoded. This block is then reconstructed in function 145 from the bitmap, fg and bg. Control then returns to function 135 to complete the decoding. In the case of SATURATED TEXT, block 146 sets fg to be equal to the maximum gray level, and block 147 sets bg to zero. The block is then reconstructed in functions 144 and 145, as in the case of TEXT blocks.

Figure 15:
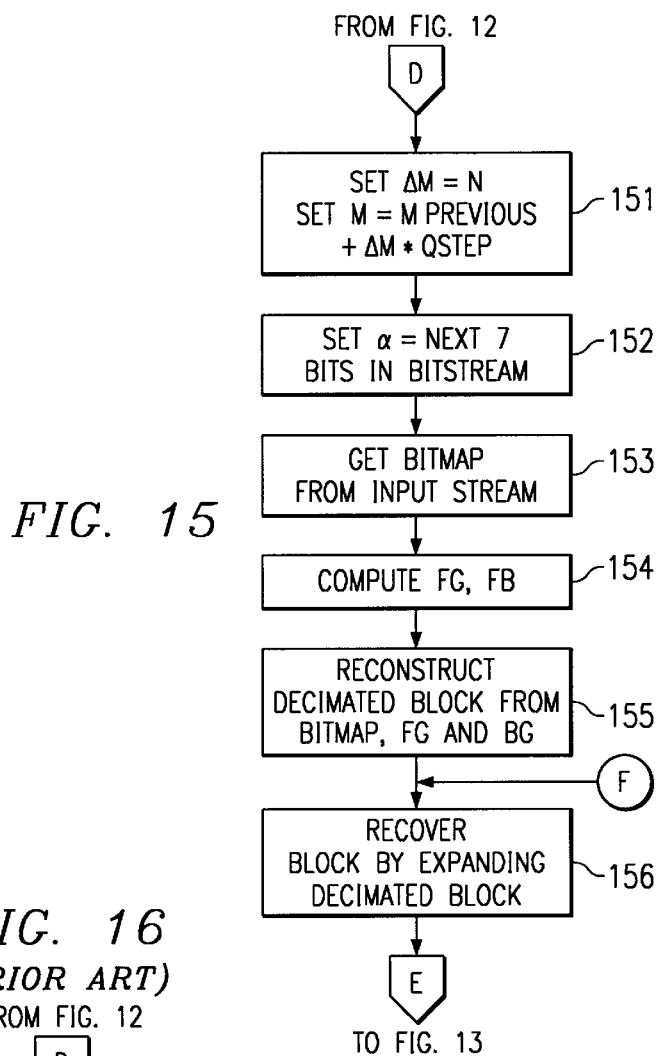
FIGS. 15, 16 and 17 show alternate methods of Image block decompression.

If the block being decoded is an IMAGE block, it may have been compressed using either BTC, DPCM or DCT algorithms. Branching on the compression algorithm, if BTC was chosen we continue on FIG. 15. Block 151 sets Delta_m to the N decoded earlier, and then calculates m=m_previous+(Delta_m*Qstep). Block 152 will than decode ALPHA from the next 7 bits in the bitstream. Block 153 recovers the bitmap by reading the next pxq bits from the bitstream, and then in block 154 we compute fg and bg as follows:

$$bg=m-((N*alpha)/(2*bgCount))$$

$$bg=m+((N*alpha)/(2*fgCount))$$

where bgCount is the number of pixels in the bitmap set to the background and fgCount is the number of pixels set to the foreground. Function 155 can now reconstruct the decimated block using the values of the bitmap, fg and bg. Next, function 156 recovers the final block by expanding the decimated block. This expansion may be done by simple pixel replication, or preferably by averaging the pixels for better image quality.

Figure 16:
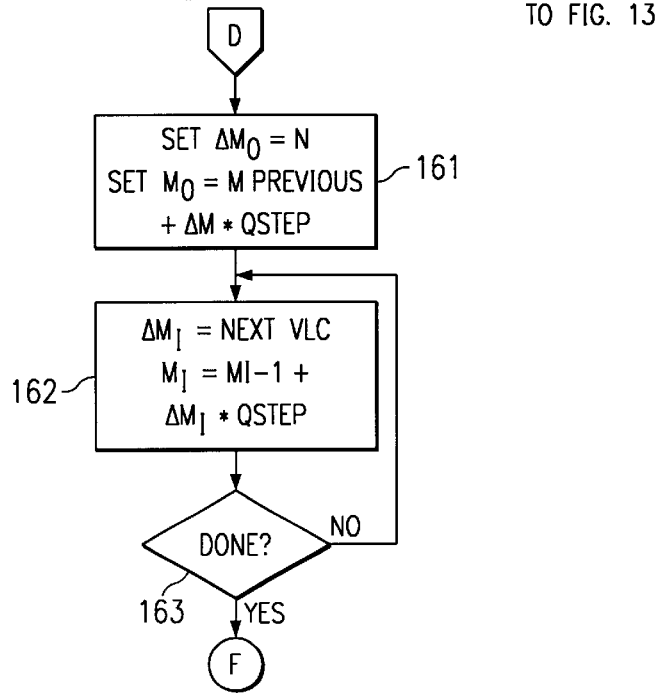

FIG. 16 shows the decompression flow if DPCM was used for compression. Block 161 sets the Delta_m to N recovered earlier, and than computes the first pixel as follows: $m_0$=m_previous+(Delta_m*Qstep). Block 162 computes the next and succeeding pixels by setting Delta_$m_i$=$m_{i-1}$+Delta_$m_1$*Qstep. Decision block 163 will loop back to function 162 until the block is completed, then transfer control to function 156 to complete the decoding.

Figure 17:
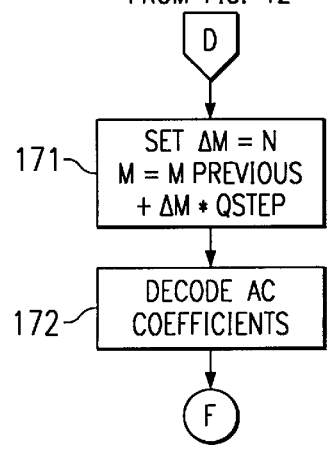

The flow for DCT based decompression is shown in FIG. 17. Block 171 sets Delta_m to be equal to N decoded earlier and then computes m=m_previous+(Delta_m*Qstep). In block 172 we decode the AC coefficients in the bitstream. The method of compression and decompression using Discrete Cosine Transforms (DCT) is well known in the art, and is part of the JPEG (Joint Photographers Expert Group) and MPEG (Motion Picture Expert Group) International Standards. After the decoding is complete, control is transferred to function 156 to expand the reconstructed block and to complete the process.

Figure 18:
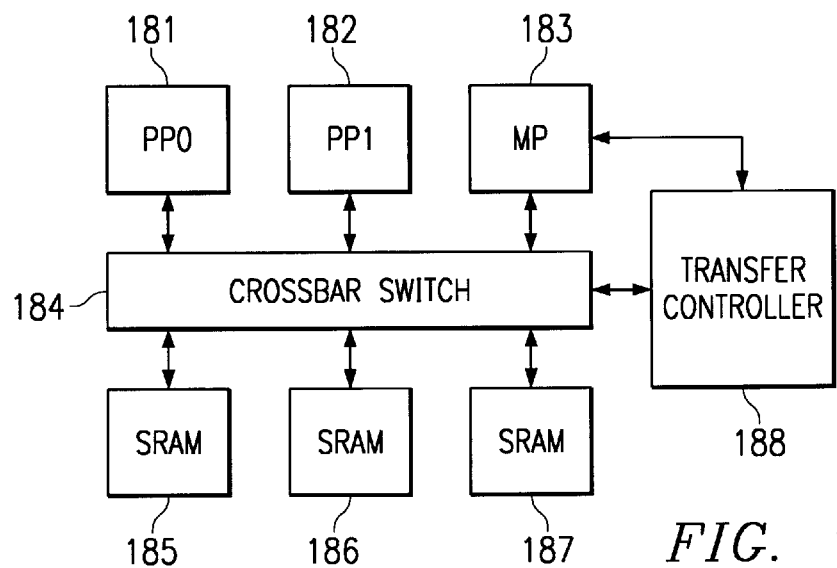
FIG. 18 shows a block diagram of the TMS320C82 DSP.

The compression method shown can be very efficiently implemented on a multiprocessor Digital Signal Processor (DSP) such as the Texas Instruments TMS320C82. The basic architecture of this DSP is shown on FIG. 18.

The TMS320C82 is a fully programmable parallel processing platform that integrates two advanced DSP cores—PP0 (181) and PP1 (182), a Reduced Instruction Set (RISC) processor 183, multiple Static Random Access Memory (SRAM) blocks 185, 186 and 187, a crossbar switch 184 that interconnects all the internal processors and memories, and a Transfer Controller (TC) 188 that controls external communications.

The hybrid compression algorithms may be implemented on the DSP cores on the TMS320C82, fully utilizing the special hardware modes provided in the device. BTC coding and decoding in particular may be very efficiently implemented using the mask expansion logic and the 3-input Arithmetic Logic Unit (ALU) to merge the foreground fg and background bg based on the expanded mask. For real-time compression and decompression it is usually desirable to arrange the PP's in a pipeline mode as shown in FIGS. 19 and 20.

Figure 19:
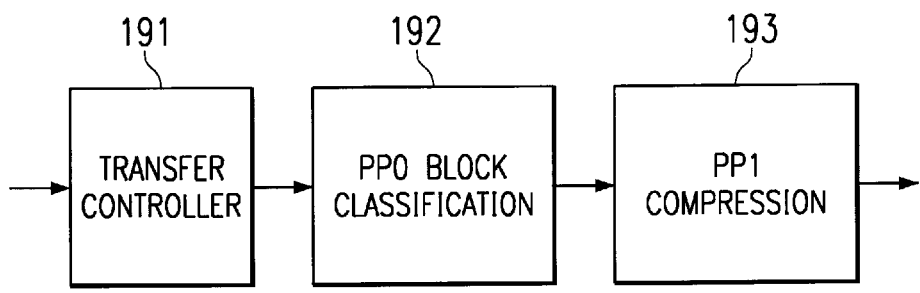
FIGS. 19 and 20 show compression and decompression flows on the TMS320C82.
Figure 20:
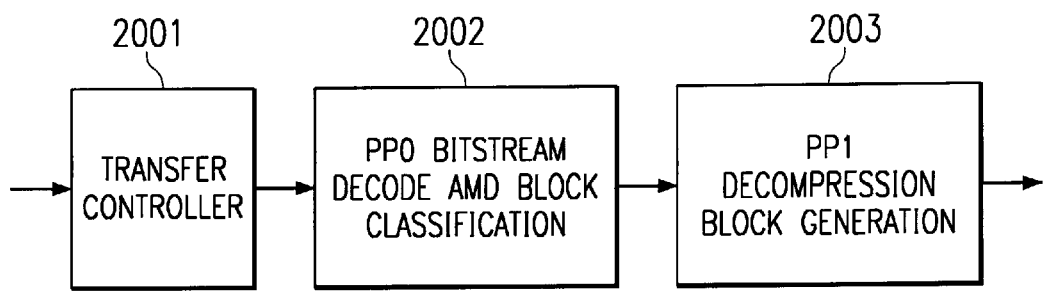

FIG. 19 shows one possible compression implementation with PP0 (192) classifying the blocks and PP1 (193) doing the actual compression. FIG. 20 similarly shows the decompression flow, with the bitstream decode and block classification taking place in PP0 (2002), and the decompression and block regeneration in PP1 (2003).

The DPCM decompression flow shown on FIG. 16 is the conventional implementation of the DPCM algorithm. An alternate, more efficient method is shown in this invention. Since decompression must be done in real time to keep up with the printer mechanism, improving the efficiency of the decompression process is of utmost importance, even if it is at the expense of introducing added complexity during the compression phase. The improved method shown in this invention involves modifying the compression algorithm in a way that will permit decoding multiple pixels in parallel, thus significantly reducing decompression time.

In the new algorithm, each image block is logically subdivided into rectangular sub blocks. All pixels in the sub block are then coded with the same code size. During compression, each pixel is predicted from the pixel to it's left. The difference of a pixel from it's prediction forms the difference pixel. The bits required to code each difference pixel is then determined. Next, we determine the maximum difference (max_delta_bits) for each sub block. A look up table (LUT) is then used to map max_delta_bits to the actual number of bits used to code this block (use_bits). All the difference pixels in the sub block will be coded with a size equal to use_bits. Next, another look up table determines the mode of the sub block. The mode is a bit pattern used to code use_bits. The mode of a sub block is transmitted before each sub block so the decompression algorithm can use the mode to determine use_bits. Alternately, all the modes of the sub blocks within a block may be transmitted together. This will usually simplify the decoder.

A use_bits value of 0 means that there is no difference between the predictors and the pixels in a sub block. In this case, no difference pixels will be transmitted as the decompressor knows that the differences are 0. This results in an improvement in the compression ratio.

When the decompressor encounters an IMAGE block coded with this improved version of DPCM, it decodes the image one sub block at a time. The mode of the sub block is used to determine the pixel size that was used to code the difference pixels in that sub block (use_bits).

use_bits=0 The sub block is easily decoded. Each column in the sub block equals the column to it's left.

use_bits=8 Rather than sending the 8 bit difference pixels, the compression algorithm can transmit the original 8 bit pixel values, thereby eliminating the additional unnecessary steps needed in the decoder.

Use_bits=(1:7) 2 bit difference values can be easily expanded four at a time using a look up table that maps 4, 2-bit differences to a 32-bit word that then stores the 8-bits/pixel expanded version of the four pixels. Similarly, 4-bit differences can be expanded two at a time using the LUT.

The split ALU mode of the Texas Instruments TMS320C82 Digital Signal Processor in the preferred embodiment of this invention enables the processing of four pixels at a time, thereby resulting in a very efficient decompression flow.

An additional improvement in decoding speed will be achieved by bit stuffing with 0's to the nearest byte boundary before transmitting the difference pixels. While this will have a negative effect on the compression ratio, it will simplify decompression as there will be no need for bit stream alignment. It is also possible to force byte alignment in the bit stream for all blocks. One way to accomplish this is by restricting the value of use_bits to 0,2,4 or 8, again at the expense of compression efficiency.

FIGS. 21 through 26 show an example of the parallel difference coding algorithm of this invention. FIG. 21 shows 2 consecutive 8×8 pixel blocks 2009 and 2010, where 2009 is the previous block and 2010 is the current block. Current block 2010 is further divided into sub blocks 2011 and 2012, with each sub block consisting of 2 rows of 4 pixels. Row 2004 of the previous block is the predictor for row 2005 of the current block. Row 2005 then predicts row 2006, row 2006 predicts row 2007, and row 2007 predicts row 2008. FIG. 22 shows the rows of difference pixels derived as follows:

Row 2101=Row 2005−Row 2004
Row 2102=Row 2006−Row 2005
Row 2103=Row 2007−Row 2006
Row 2104=Row 2008−Row 2007

FIG. 23 shows the number of bits required to code each pixel in rows 2201, 2202, 2203 and 2204. FIG. 24 gives the max_delta_bits in sub block 0 (2301) and in sub block 1 (2302). In FIG. 25, 2401 and 2405 show the use_bits for sub block 0 and 1 respectively. The use_bits shown here are derived from the look up table 2500 in FIG. 26, where max_delta_bits (2501) is related to use_bits (2502) and the mode (2503).

It should be noted that the prediction can be on a row or column basis. Changing the prediction to the column order will have the side effect of rotating the block.

Although the present invention was described in detail, it should be understood that various changes, substitutions and alterations may be made to the embodiments described herein without departing from the spirit and scope of the invention.

What is claimed is:

1. A data processing method for compressing data representing a composite page comprising of solid, text and image areas, comprising the steps of:

dividing an uncompressed page into equal size non-overlapping blocks before compression;

classifying each block as being part of an area containing TEXT, SATURATED TEXT, IMAGE or SOLID components;

compressing blocks classified as IMAGE blocks using a Differential Pulse Code Modulation algorithm, including logically subdividing IMAGE blocks to be compressed into rectangular sub blocks and coding all the pixels in said sub blocks coded with the same code, determining within each sub block the maximum difference between the predictions and the actual pixel values, and using the maximum difference for each sub block as an 8-bit index into a Look Up Table (LUT) to determine the actual number of bits (use_bits) used for coding each pixel in the sub block.

2. The data processing method of claim 1 further comprising the step of:

determining the maximum and minimum gray level values of a block, and if the maximum value is equal to the minimum value classifying the block as SOLID.

3. The data processing method of claim 1 further comprising the step of:

determining the maximum and minimum gray level values of a block are determined, and if all pixels in the block are equal to either the maximum or the minimum, classifying the block as TEXT.

4. The data processing method of claim 1 further comprising the step of:

determining the maximum and minimum gray level values of a block are determined, and if the maximum is equal to the maximum gray level possible and the minimum is equal to the minimum gray level possible, classifying the block as SATURATED TEXT.

5. The data processing method of claim 1 further comprising the step of:

classifying all blocks not classified as SOLID, TEXT or SATURATED TEXT as IMAGE.

6. The data processing method of claim 1 further comprising the step of:

predicting the value of each pixel in the sub block from the value of the pixel to its left, in column order.

7. The data processing method of claim 1 further comprising the step of:

predicting the value of each pixel in the sub block from the value of the pixel above it in row order, thus rotating the pixel during the compression step.

8. The data processing method of claim 1 further comprising the step of:

bit stuffing each difference pixel with 0 to the nearest byte boundary in order to eliminate the need for bit stream alignment during decompression.

9. The data processing method of claim 1 further comprising the step of:

restricting the value of use_bits to be 0, 2, 4 or 8 in order to guarantee byte alignment of the compressed data.

10. The data processing method of claim 1 further comprising the step of:

if use_bits equals 8, transmitting the actual pixel value without compression.

11. The data processing method of claim 1 further comprising the step of:

using the same Look Up Table to determine the mode of the sub block, and where the mode represents the bit pattern used to encode the use_bits associated with said sub block.

12. The data processing method of claim 11 further comprising the step of:

transmitting the mode bits individually before each sub block.

13. The data processing method of claim 11 further comprising the step of:

transmitting the mode bits together for all the sub blocks within one block.

14. The data processing method of claim 12 further comprising the steps of:

decompressing the compressed data in real time as a page is printed; and determining upon decompression the number of bits used to represent each pixel (use_bits) in the sub block from the mode bits associated with said sub block.

15. The data processing method of claim 14 further comprising the step of:

interpreting upon decompression the use_bits value of 0 to mean that each column in the sub block is identical with the column to it's left.

16. The data processing method of claim 14 further comprising the steps of:
  using a Look Up Table upon decompression to expand multiple coded pixels in one step.

17. The data processing method of claim 14 further comprising the step of:
  during decompression expanding in the case of use_bits= 2, four 2-bit difference values into four 8-bit pixels contained in a 32-bit word by the use of the said Look Up Table.

18. The data processing method of claim 14 further comprising the step of:
  during decompression expanding in the case of use_bits= 4, two 4-bit difference values into two 8-bit pixels.

19. A method of printing comprising the steps of:
  receiving page data to be printed in a page description language;
  converting the page data from the page description language into a bitmap of a page to be printed;
  compressing the bitmap of the page to be printed by:
    dividing an uncompressed page into equal size non-overlapping blocks before compression;
    classifying each block as being part of an area containing TEXT, SATURATED TEXT, IMAGE or SOLID components;
    compressing each block according to a compression algorithm corresponding to the classification of that block;
    compressing blocks classified as IMAGE blocks using a Differential Pulse Code Modulation algorithm, including
      logically subdividing IMAGE blocks to be compressed into rectangular sub blocks and coding all the pixels in said sub blocks coded with the same code,
      determining within each sub block the maximum difference between the predictions and the actual pixel values, and
      using the maximum difference for each sub block as an 8-bit index into a Look Up Table (LUT) to determine the actual number of bits (use_bits) used for coding each pixel in the sub block;
    storing the compressed bitmap of the page in a frame buffer; and
  decompressing the compressed bitmap of the page from the frame buffer in real time as the page is printed.

20. The data processing method of claim 19 further comprising the step of:
  determining the maximum and minimum gray level values of a block, and if the maximum value is equal to the minimum value classifying the block as SOLID.

21. The data processing method of claim 19 further comprising the step of:
  determining the maximum and minimum gray level values of a block, and if all pixels in the block are equal to either the maximum or the minimum, classifying the block as TEXT.

22. The data processing method of claim 19 further comprising the step of:
  determining the maximum and minimum gray level values of a block, and if the maximum is equal to the maximum gray level possible and the minimum is equal to the minimum gray level possible, classifying the block as SATURATED TEXT.

23. The data processing method of claim 19 further comprising the step of:
  classifying all blocks not classified as SOLID, TEXT or SATURATED TEXT as IMAGE.

24. The data processing method of claim 19 further comprising the step of:
  predicting the value of each pixel in the sub block from the value of the pixel to its left, in column order.

25. The data processing method of claim 19 further comprising the step of:
  predicting the value of each pixel in the sub block from the value of the pixel above it in row order, thus rotating the pixel during the compression step.

26. The data processing method of claim 19 further comprising the step of:
  bit stuffing each difference pixel with 0 to the nearest byte boundary in order to eliminate the need for bit stream alignment during decompression.

27. The data processing method of claim 19 further comprising the step of:
  restricting the value of use_bits to be 0, 2, 4 or 8 in order to guarantee byte alignment of the compressed data.

28. The data processing method of claim 19 further comprising the step of:
  if use_bits equals 8, transmitting the actual pixel value without compression.

29. The data processing method of claim 19 further comprising the step of:
  using the same Look Up Table to determine the mode of the sub block, and where the mode represents the bit pattern used to encode the use_bits associated with said sub block.

30. The data processing method of claim 29 further comprising the step of:
  transmitting the mode bits individually before each sub block.

31. The data processing method of claim 29 further comprising the step of:
  transmitting the mode bits together for all the sub blocks within one block.

32. The data processing method of claim 29 further comprising the steps of:
  determining upon decompression the number of bits used to represent each pixel (use_bits) in the sub block from the mode bits associated with said sub block.

33. The data processing method of claim 32 further comprising the step of:
  interpreting upon decompression the use_bits value of 0 to mean that each column in the sub block is identical with the column to it's left.

34. The data processing method of claim 32 further comprising the steps of:
  using a Look Up Table upon decompression to expand multiple coded pixels in one step.

35. The data processing method of claim 32 further comprising the step of:
  during decompression expanding in the case of use_bits= 2, four 2-bit difference values into four 8-bit pixels contained in a 32-bit word by the use of the said Look Up Table.

36. The data processing method of claim 32 further comprising the step of:
  during decompression expanding in the case of use_bits= 4, two 4-bit difference values into two 8-bit pixels by the use of the said Look Up Table.

* * * * *